Patented Apr. 27, 1937

2,078,458

UNITED STATES PATENT OFFICE 2,078,458

MOTHPROOFING COMPOSITIONS OF MATTER

Theron P. Remy, Los Angeles, Calif., assignor to The Texas Company, New York, N. Y., a corporation of Delaware No Drawing. Application June 23, 1934, Serial No. 732,117

6 Claims. (Cl. 167—37)

This invention relates to mothproofing compositions and more particularly to mothproofing compositions of matter containing aluminum naphthenate as the active ingredient. The invention also relates to the method of treating fabrics, textile fibers, animal fibers, and the like, with compositions such as herein described.

It is well known that animal fibers such as wool or fur are subject to attacks from various insects and are particularly liable to be eaten and destroyed by moths. It is now well known that, in order to render animal and textile fibers proof against moths, it is necessary that the fibers themselves be impregnated with compounds which render the fibers undesirable as a foodstuff to the larvae of the clothes moth. I have discovered that aluminum naphthenate when evenly and finely distributed on fibers renders them immune against attack.

Aluminum naphthenate is the aluminum salt of naphthenic acids which are recoverable from petroleum. It is readily prepared by reacting molecular weights of aqueous solutions of an aluminum salt and an alkali metal naphthenate, the aluminum naphthenate being precipitated as a water insoluble compound. The precipitate is collected and may then be subjected to any one of a number of dehydrating processes such as drying at an elevated temperature or preferably dissolving in a solvent such as petroleum spirits, ether, or the like, whereupon any water present settles out leaving the supernatant solution of dry aluminum naphthenate. By evaporating off the solvent, the aluminum naphthenate is obtainable as a dry material.

I have discovered that by dissolving a small proportion of the dry aluminum naphthenate in a suitable solvent therefor such as naphtha, chlorinated hydrocarbons, ether, amyl acetate, in fact any readily vaporizable solvent for the aluminum naphthenate, and by spraying the textile or animal fibers therewith, these fibers are rendered immune to attack by moths. Although a solution of solvent containing approximately one-half of one percent of aluminum naphthenate will give satisfactory control, higher or lower percentages of the material may be employed depending upon the fibers being treated.

I have also discovered that the aluminum naphthenate may be employed in the form of an emulsion with water. The fibers or materials to be treated may either be immersed in the emulsion or else sprayed therewith. The emulsions may be prepared by emulsifying a solution of aluminum naphthenate in a proper solvent, with water in the presence of a suitable emulsifying agent. The emulsion is preferably so prepared that it may be diluted with a large proportion of water without breaking down and permitting the separation of the aluminum naphthenate.

In the preparation of the aluminum naphthenate emulsions, any one of a large number of emulsifying agents may be employed. These include soaps which are both oil and water soluble and include the soaps of sulfonic, naphthenic or fatty acids. Soaps such as sodium naphthenate and triethenolamine oleate are especially effective.

I give herewith the method, as well as the proportions of ingredients used in preparing a typical aluminum naphthenate emulsion. A saturated solution of aluminum naphthenate in amyl acetate is prepared by dissolving approximately 30% of the aluminum salt in the solvent. 80% of this saturated solution is then emulsified with 15% of water in the presence of approximately 5% of triethanolamine oleate. This emulsion constitutes a concentrate or stock emulsion. By mixing approximately 5% of the stock emulsion with 95 parts of water, there is obtained a dilute emulsion. The fabrics to be treated may either be sprayed with the dilute emulsion or else immersed therein.

Obviously many modifications and variations of the invention as hereinbefore set forth, may be made without departing from the spirit and scope thereof, and therefore only such limitations should be imposed as are indicated in the appended claims.

I claim:

1. A mothproofing reagent comprising aluminum naphthenate and a solvent for the aluminum naphthenate.

2. A mothproofing reagent comprising aluminum naphthenate and a readily vaporizable aluminum naphthenate solvent.

3. A mothproofing reagent comprising aluminum naphthenate and naphtha.

4. A mothproofing composition of matter containing aluminum naphthenate as an active ingredient.

5. A mothproofing emulsion comprising aluminum naphthenate, aluminum naphthenate solvent, water, and an emulsifying agent.

6. A mothproofing emulsion comprising aluminum naphthenate, amyl acetate, water, and triethanolamine oleate.

THERON P. REMY.